(12) United States Patent
Lee et al.

(10) Patent No.: US 10,353,352 B2
(45) Date of Patent: Jul. 16, 2019

(54) SYSTEM AND METHOD FOR DISTRIBUTED MACHINING SIMULATION

(71) Applicant: Mitsubishi Electric Research Laboratories, Inc., Cambridge, MA (US)

(72) Inventors: Teng-Yok Lee, Cambridge, MA (US); Alan Sullivan, Middleton, MA (US); Jay Thornton, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 319 days.

(21) Appl. No.: 15/438,954

(22) Filed: Feb. 22, 2017

(65) Prior Publication Data
US 2018/0239312 A1 Aug. 23, 2018

(51) Int. Cl.
*G05B 13/04* (2006.01)
*G05B 19/4093* (2006.01)
(Continued)

(52) U.S. Cl.
CPC ......... *G05B 13/04* (2013.01); *G05B 19/4069* (2013.01); *G05B 19/4093* (2013.01);
(Continued)

(58) Field of Classification Search
CPC ................ G05B 13/04; G05B 19/4069; G05B 19/4093; G05B 2219/23456; G05B 2219/35311; G06F 9/5072
See application file for complete search history.

(56) References Cited

U.S. PATENT DOCUMENTS 6,643,560 B2 * 11/2003 Shimomura ..... G05B 19/40932
219/121.67
7,321,366 B2 * 1/2008 Teshima .............. G06F 17/5018
345/424
(Continued)

FOREIGN PATENT DOCUMENTS

DE 102011105141 A1 12/2012
WO 2009076987 A1 6/2009

*Primary Examiner* — Abdelmoniem I Elamin
(74) *Attorney, Agent, or Firm* — Gennadiy Vinokur; James McAleenan; Hironori Tsukamoto

(57) ABSTRACT

A distributed machining simulation partitions a model of the workpiece to produce a set of sub-workpieces and modifies the machining instructions for each sub-workpiece to produce a set of groups of modified machining instructions different from the machining instructions. Each group of the modified machining instructions is associated with a sub-workpiece and includes effective machining instructions that move the machining tool through the sub-workpiece and at least one fake machining instruction that moves the machining tool through the model of the workpiece outside of the sub-workpiece. The distributed machining simulation remote hosts to simulate the machining of the workpiece using at least one group of the modified machining instructions to produce geometries of a machining simulation of the workpiece, each geometry is associated with a corresponding sub-workpiece and reconstructs a representation of the machined workpiece using a portion of each geometry within the volume of the corresponding sub-workpiece.

20 Claims, 15 Drawing Sheets

(51) Int. Cl.
*G05B 19/4069* (2006.01)
*G06F 9/50* (2006.01)

(52) U.S. Cl.
CPC .. *G06F 9/5072* (2013.01); *G05B 2219/23456* (2013.01); *G05B 2219/35311* (2013.01)

(56) References Cited

U.S. PATENT DOCUMENTS

| | | | | |
|---|---|---|---|---|
| 7,333,104 | B2* | 2/2008 | Kase | G06T 17/005 |
| | | | | 345/420 |
| 7,372,460 | B2* | 5/2008 | Usami | G06T 17/20 |
| | | | | 345/419 |
| 7,406,361 | B2* | 7/2008 | Ohmori | B33Y 50/02 |
| | | | | 264/401 |
| 7,898,540 | B2* | 3/2011 | Usami | G06T 17/20 |
| | | | | 345/424 |
| 8,238,256 | B2 | 8/2012 | Nugent | |
| 8,483,858 | B2 | 7/2013 | Sullivan et al. | |
| 8,838,419 | B2 | 9/2014 | Sullivan et al. | |
| 8,972,040 | B2* | 3/2015 | Kimura | G05B 19/40932 |
| | | | | 700/187 |
| 2003/0033049 | A1* | 2/2003 | Shimomura | G05B 19/40932 |
| | | | | 700/187 |
| 2015/0088301 | A1* | 3/2015 | Erdim | G05B 19/18 |
| | | | | 700/190 |

\* cited by examiner

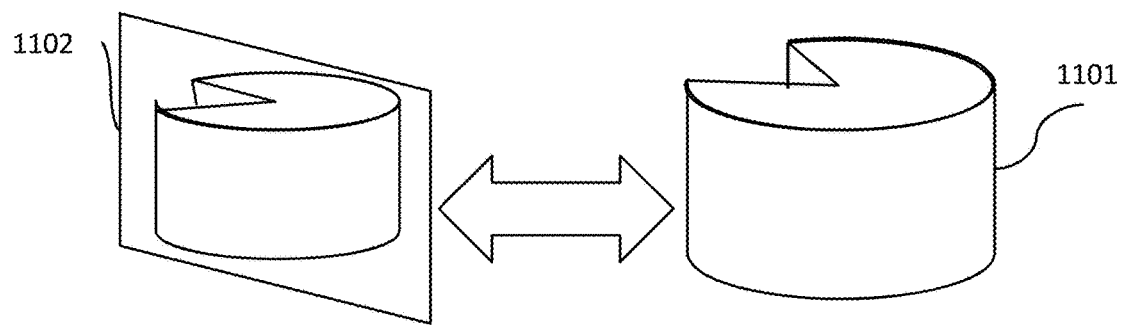
FIG. 11A
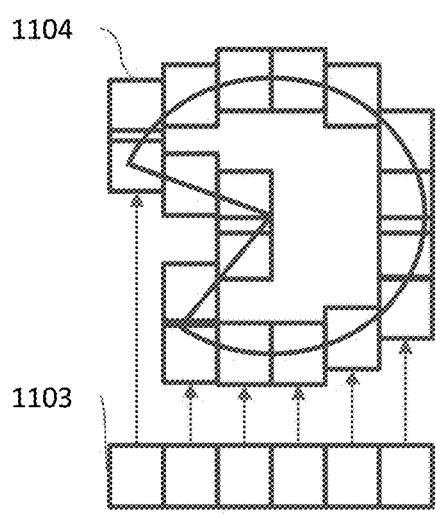 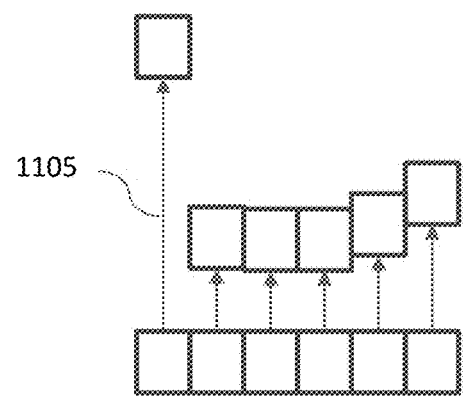
FIG. 11B  FIG. 11C

SYSTEM AND METHOD FOR DISTRIBUTED MACHINING SIMULATION

TECHNICAL FIELD

The invention relates generally to simulating machining of a workpiece, and more particularly to a system and a method for distributed machining simulation via a set of remote hosts.

BACKGROUND

Numerically controlled (NC) machining, e.g., turning, boring, drilling, broaching, sawing, shaping, reaming, milling, tapping, grinding, is a mechanical process that uses rotary tools to cut various materials, e.g., a metal material. Given a piece of material, which is called workpiece hereafter, NC machining uses a sequence of motor instructions to move/rotate worktools, e.g., cutters, to intersect the workpieces. With careful design, the customer of NC machining machine can cut the input workpiece to specific shapes. As the sequence of instructions can be complex to design by hand, it is common to use Computer-Aided Manufacturing (CAM) software to generate the instructions to transform a given input workpiece shape into a desired output workpiece shape. Likewise, computers can be used to simulate the machining process to confirm that the instructions can work correctly. The defective machining instructions waste machining time and workpiece materials, but can also hurt the NC machining machine. For instance, if the instructions lead to any collision between the cutters and the NC machining machine, the motors can break, which can be expensive to repair.

During the NC machining simulation a model of a workpiece is edited with a computer representation of a tool, e.g., an NC machining tool, and a set of motions, which simulate the machining process. The simulation is performed according to machining instructions that specify one or combination of a type and the motion of the machining tool. The simulation can visualize the model of the object and the representation of the tool on a display device to detect potential collisions between parts, such as the workpiece and the tool holder, and to verify a final shape of the object.

The final shape of the object is affected by the selection of the tool and the motions. Instructions for controlling the motions are typically generated using a computer aided manufacturing system from a graphical representation of a desired final shape of the object. The motions are typically implemented using numerical control programming language, also known as preparatory code or G-Codes, see the RS274D and DIN 66025/ISO 6983 standards.

The NC machining simulation can be time consuming for large workpieces and/or extensive machining instructions. A number of methods, such as methods disclosed in U.S. Pat. No. 8,483,858 and U.S. Pat. No. 8,838,419, aims to optimize the machining simulation. However, in some situations, further acceleration of the machining simulation is desired.

SUMMARY

Some embodiments are based on recognition that the speed of simulation of numerically controlled (NC) machining can be accelerated by using multiple compute hosts for a single simulation. For example, modern cloud computing even allows to rent computer resources in other's computing facilities and thus save the maintenance overhead and costs to maintaining a local cluster of computing facilities.

However, when the NC machining simulation is executed on remote hosts, e.g., remote computers and/or computers owned by others, the security can be a concern for both the manufactures and customers of the NC machining simulators. Hence, it is an object of some embodiment to provide a system and a method for distributed machining simulation via a set of remote hosts in a secure manner.

Some embodiments are based on understanding that different portions and/or volumes of a workpiece are simulation independent. That is, the simulation of machining of one volume is independent from the machining simulation of another volume of the workpiece. Accordingly, the machining instructions for simulating the machining of a first volume of the workpiece can be combined with different and even arbitrarily and fake instructions for simulation of the machining of a second volume of the workpiece without effecting the simulation of the machining of the first volume.

This understanding leads to a realization that in such a combination of the real and fake machining instructions, only the knowledge of a geometry and location of the volumes allows to separate true machining simulation from the fake one. However, such knowledge can be retained by a client of distributed machining simulation. To that end, the client can distribute the real and fake machining instructions determined for different volumes of the model of the workpiece to perform the machining simulation at different hosts. Using the knowledge of the geometry and the location of each volume, the client can further extract and combine only portions of the simulations performed by real machining instructions to produce the result of distributed simulation.

Accordingly, one embodiment discloses a method for simulating machining of a workpiece according to machining instructions for moving a machining tool with respect to the workpiece, wherein the simulation is performed using a processor in communication with a set of remote hosts, wherein the processor is coupled with stored instructions implementing the method, wherein the stored instructions, when executed by the processor carry out at least some steps of the method.

The steps of the method includes partitioning a model of the workpiece into nonintersecting volumes to produce a set of sub-workpieces; modifying the machining instructions for each sub-workpiece to produce a set of groups of modified machining instructions different from the machining instructions, each group of the modified machining instructions is associated with a sub-workpiece and includes effective machining instructions that moves the machining tool through the sub-workpiece and at least one fake machining instruction that moves the machining tool through the model of the workpiece outside of the sub-workpiece; causing the remote hosts to simulate the machining of the workpiece using at least one group of the modified machining instructions to produce geometries of a machining simulation of the workpiece, each geometry is associated with a corresponding sub-workpiece; and reconstructing a representation of the machined workpiece using a portion of each geometry within the volume of the corresponding sub-workpiece.

Another embodiment discloses a system in a communication with a set of remote hosts for simulating machining of a workpiece according to machining instructions for moving a machining tool with respect to the workpiece. The system includes a memory to store the machining instructions and a model of the workpiece; a processor to partition a model of the workpiece into nonintersecting volumes to produce a set of sub-workpieces; and modify the machining instructions for each sub-workpiece to produce a set of groups of modified machining instructions different from the machining instructions, each group of the modified machining instructions is associated with a sub-workpiece and includes effective machining instructions that moves the machining tool through the sub-workpiece and at least one fake machining instruction that moves the machining tool through the model of the workpiece outside of the sub-workpiece; and a transceiver to transmit to each remote host over a communication link the group of modified machining instructions associated with the corresponding sub-workpiece and receive from each remote host, in response to the transmitting, the geometry associated with the corresponding sub-workpiece, wherein the processor reconstructs a representation of the machined workpiece using a portion of each geometry within the volume of the corresponding sub-workpiece.

Yet another embodiment discloses a non-transitory computer readable storage medium embodied thereon a program executable by a processor for performing a method. The method includes partitioning a model of the workpiece into nonintersecting volumes to produce a set of sub-workpieces; modifying the machining instructions for each sub-workpiece to produce a set of groups of modified machining instructions different from the machining instructions, each group of the modified machining instructions is associated with a sub-workpiece and includes effective machining instructions that moves the machining tool through the sub-workpiece and at least one fake machining instruction that moves the machining tool through the model of the workpiece outside of the sub-workpiece; causing the remote hosts to simulate the machining of the workpiece using at least one group of the modified machining instructions to produce geometries of a machining simulation of the workpiece, each geometry is associated with a corresponding sub-workpiece; and determining a representation of the machined workpiece using a portion of each geometry within the volume of the corresponding sub-workpiece.

BRIEF DESCRIPTION OF THE DRAWINGS

FIG. 11A shows a schematic of rendering the simulated computer geometry into an image according to some embodiments.

FIG. 11B shows the top view of exemplar computer geometry and the image plane.

FIG. 11C shows a schematic of the front most fragments that update the pixels of the image of FIG. 11A.

DETAILED DESCRIPTION

Figure 1:
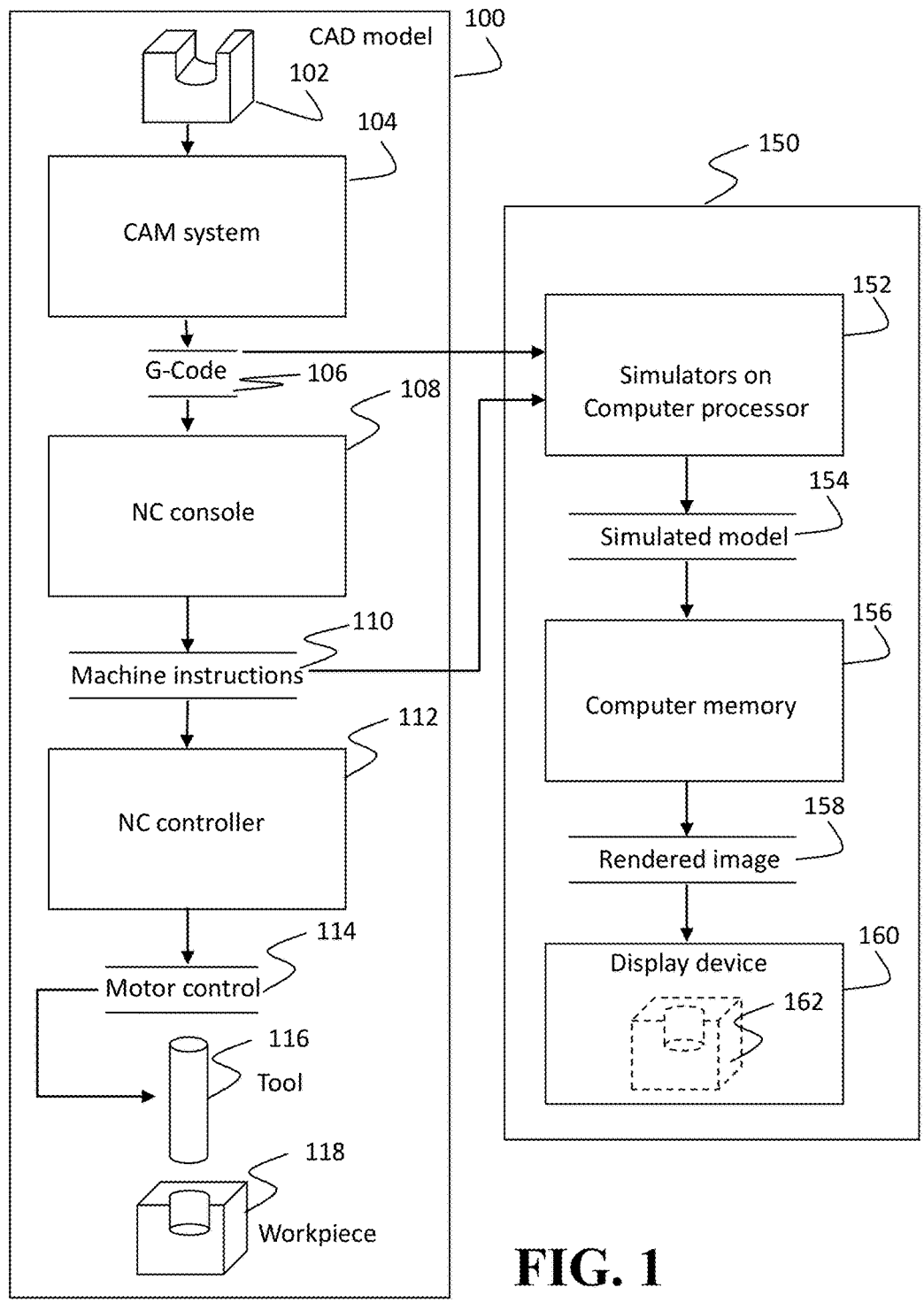
FIG. 1 shows a flow diagram of an NC milling machine and a system and method for simulating NC milling according to embodiments of the invention.

FIG. 1 shows a numerically controlled (NC) machining system 100, and a NC machining simulation system 150 used by some embodiments. Examples of the machining include turning, boring, drilling, broaching, sawing, shaping, reaming, milling, tapping, and grinding operations. In the NC machining system 100, a computer aided design (CAD) model 102 is input to a computer aided manufacturing (CAM) system 104, which generates G-Codes 106 for controlling an NC machining machine. During the NC machining, the G-Codes are input to an NC machining console 108, which processes each G-Code to produce a corresponding set of NC machine instructions 110. The NC machine instructions are input into an NC controller 112, which produces a set of motor control signals 114 to move a tool 116 relative to a workpiece 118 in order to machine the workpiece.

The simulation system 150 can take as input either the G-Codes 106 generated by the computer aided manufacturing system 104, or the NC machine instructions 110 generated by the NC console 108. The input to the simulation system is read by a computer processor 152, which simulates machining of the workpiece, and outputs a simulated model 154, which can be stored in a computer memory 156. The processor 152 can render the stored simulated model 154 to generate a rendered image 158 which can be output to a display device 160. A displayed image 162 can be compared to the computer aided design model 102 to verify the G-Codes 106 or NC machine instructions 110 prior to performing the actual NC machining of the workpiece. In some embodiments, the simulation system (150) performs both the simulation and rendering on a single computer. Additionally or alternatively, some embodiments perform both the simulation and rendering on multiple computers.

Some embodiments are based on recognition that the speed of simulation of numerically controlled (NC) machining can be accelerated by using multiple compute hosts for a single simulation. For example, modern cloud computing even allows to rent computer resources in other's computing facilities and thus save the maintenance overhead and costs to maintaining a local cluster of computing facilities.

However, when the NC machining simulation is executed on remote hosts, e.g., remote computers and/or computers owned by others, the security can be a concern for both the manufactures and customers of the NC machining simulators. Hence, it is an object of some embodiment to provide a system and a method for distributed machining simulation via a set of remote hosts in a secure manner.

Figure 2:
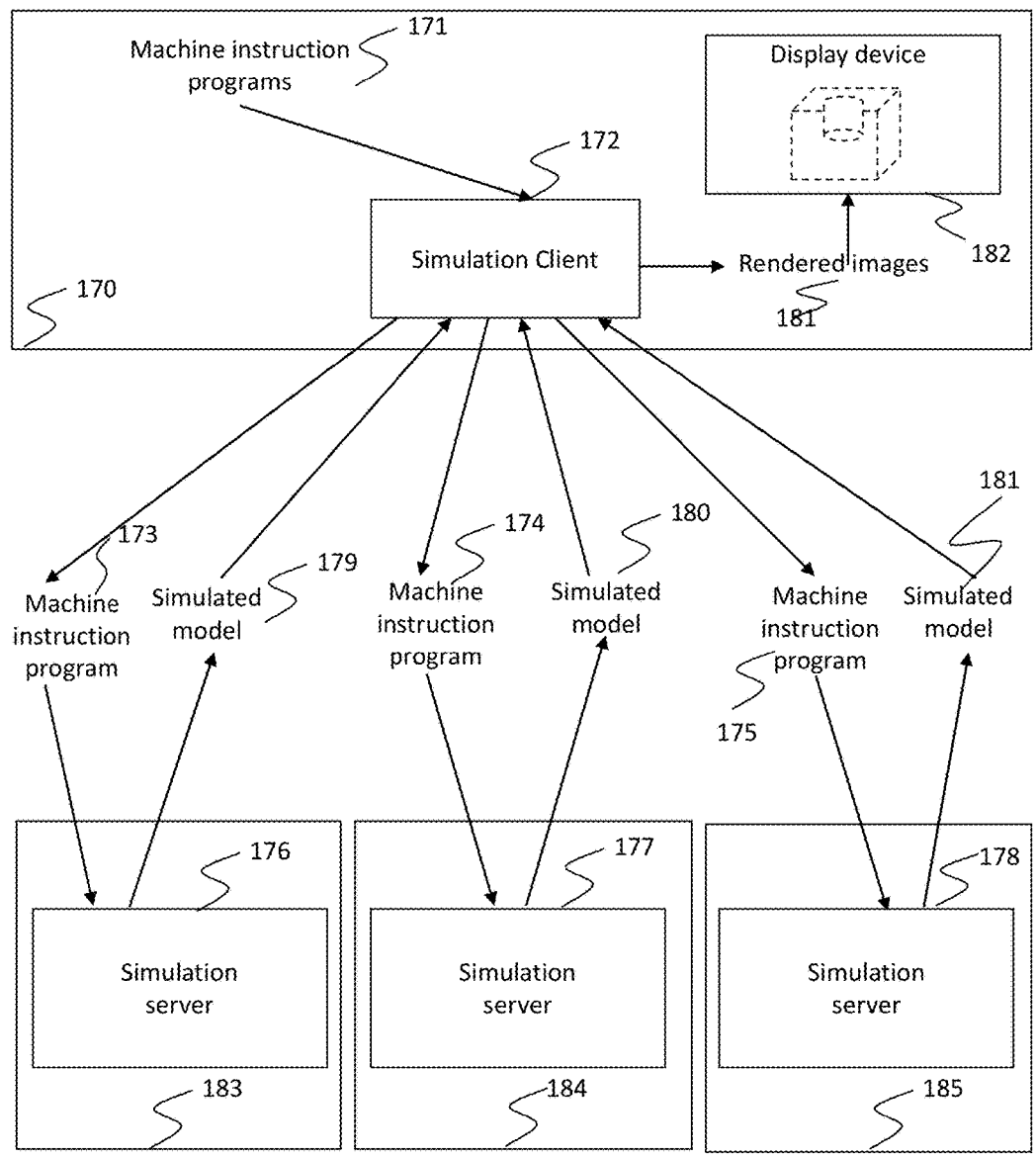
FIG. 2 shows a flow diagram of a distributed simulator for machine instruction programs.

FIG. 2 shows a block diagram of a system for distributed machining simulation according to some embodiments. In these embodiments, the simulation components, e.g., software 176, 177, and 178 for simulating machining of a workpiece with machining instructions, are installed on remote hosts 183, 184, 185. The distributed machining simulation is performed by a simulation client 172 executed by a processor 170 of the local computer. The simulation clients accept inputs from users, including the machining instructions 171 for performing the simulation. To execute distributed simulation, the simulation client modifies the machining instructions 171 for each remote host and submits the modified instructions 173, 174, 175 to the remote hosts 183, 184, and 185 for machining simulation by simulation servers 176, 177, 178. After each simulation server finishes the simulation, the simulated models 179, 180, and 181 are sent back the simulation client 172. Based on simulated models, the simulation client renders the simulation result into a single model and/or image 181, which can be rendered on the display device 182 or stored in a memory. The rendered image is identical as simulating the machine instruction program on the local host without distribution.

Figure 3:
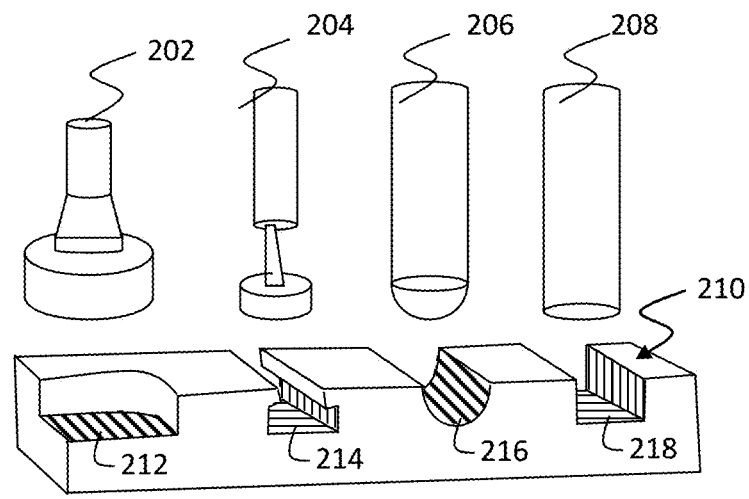
FIG. 3 shows a diagram of typical tools used for milling and typical edits in a workpiece made by moving such tools along a path.

FIG. 3 shows a set of typical tool shapes 202, 204, 206, and 208 used in NC machining. When a tool is moved relative to a workpiece 210, the tool carves material out of the workpiece. Here, the tools 202, 204, 206, and 208 remove material corresponding to surfaces 212, 214, 216, and 218 from the workpiece. The shape of the material removed by each tool is determined by the tool shape and the path of the tool relative to the workpiece. The shape of the material removed is the intersection of the workpiece and the swept volume of the tool as the tool moves along the path. For the purposes of the machining simulation, such a removed material is referred herein as a swept volume.

Figure 4:
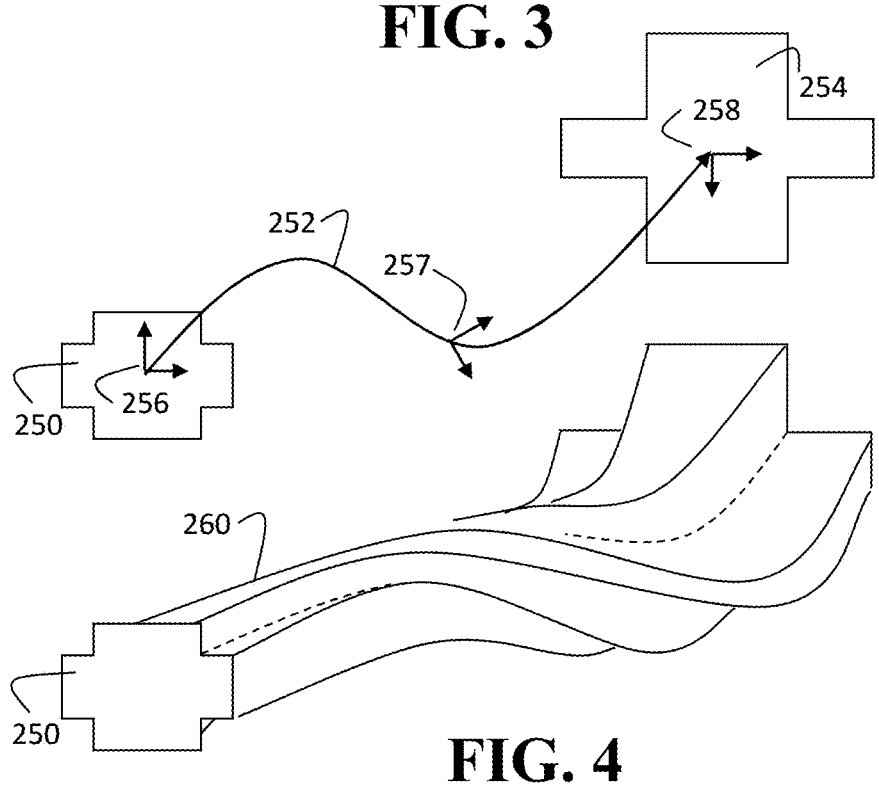
FIG. 4 shows a schematic of a swept volume determined by sweeping a 2D shape along a curved path.

FIG. 4 shows the swept volume 260 of a shape 250 that is moved along a path 252. The path 252 specifies a position of a particular point of the shape 250 as a function of time. The path can specify an orientation 256, 257, and 258 of the shape as a function of time. The path can also specify a scale of the shape or an arbitrary transformation of the shape as a function of time. In FIG. 4, the original position, orientation, and geometry of a shape 250 is transformed to a final position, orientation, and geometry of the shape 254 as it moves along the path. The swept volume modifies different portion of the workpiece in forming the geometry of the result of simulation.

Some embodiments are based on understanding that different portions and/or volumes of a workpiece are simulation independent. That is, the simulation of machining of one volume is independent from the machining simulation of another volume of the workpiece. Accordingly, the machining instructions for simulating the machining of a first volume of the workpiece can be combined with different and even arbitrarily and fake instructions for simulation of the machining of a second volume of the workpiece without effecting the simulation of the machining of the first volume.

This understanding lead to a realization that in a such a combination of the real and fake machining instructions, only the knowledge of a geometry and location of the first volume allows to separate true machining simulation from the fake one. However, such knowledge can be retained by a client of distributed machining simulation. To that end, the client can distribute the real and fake machining instructions determined for different volumes of the model of the workpiece to perform the machining simulation at different hosts. Using the knowledge of the geometry and the location of each volume, the client can further extract and combine only portions of the simulations performed by real machining instructions to produce the result of distributed simulation.

Figure 5:
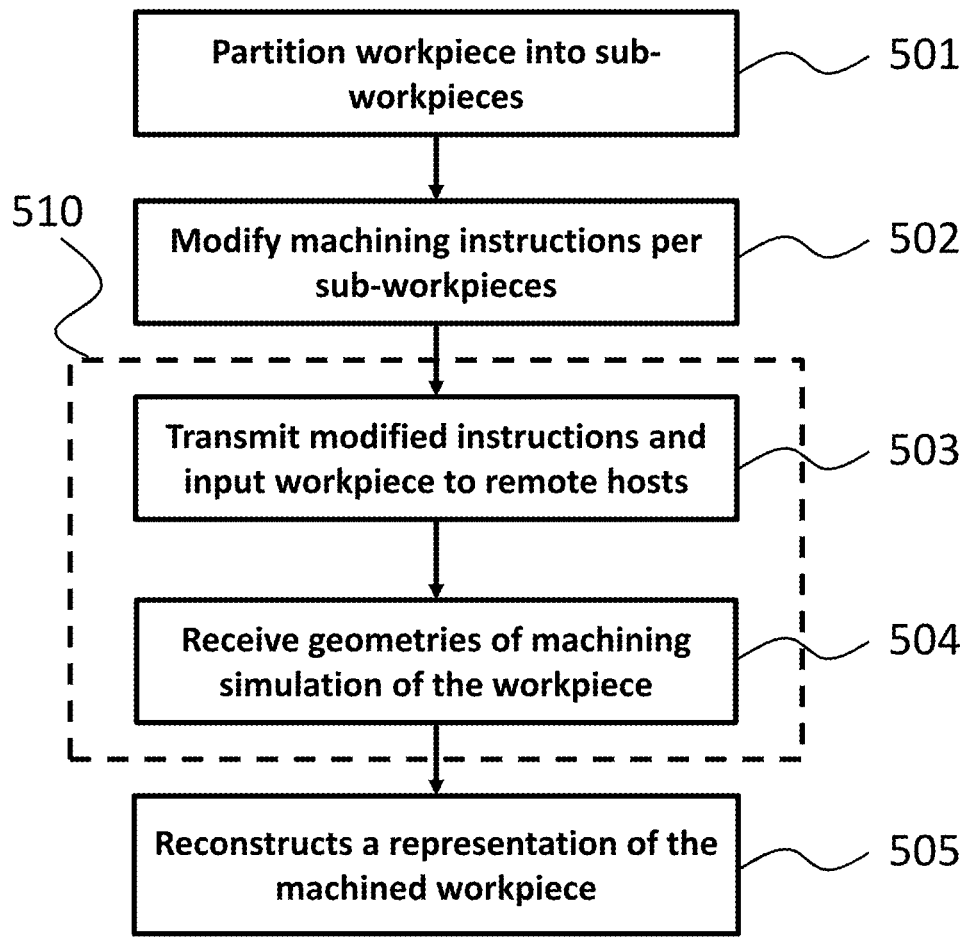
FIG. 5 shows a block diagram of a method for distributed machining simulation according to some embodiments.

FIG. 5 shows a block diagram of a method for distributed machining simulation according to some embodiments. The method simulates machining of a workpiece according to machining instructions for moving a machining tool with respect to the workpiece. The simulation is performed using a processor, e.g., the processor 170, in communication with a set of remote hosts, e.g., the hosts 183, 184, and 185. The processor is coupled with stored instructions implementing the method. The stored instructions, such as the instruction implementing the simulation client 172, when executed by the processor 170 carry out at least some steps of the method.

The method partitions 501 a model of the workpiece into nonintersecting volumes to produce a set of sub-workpieces. For example, in one embodiment, the method portions the model such that a number of sub-workpieces equals a number of remote hosts. In some implementations, the simulating client is also acting as one remote host for speeding the simulation. Additionally or alternatively, some remote hosts can perform simulation for more than one sub-workpiece.

The method modifies 502 the machining instructions for each sub-workpiece to produce a set of groups of modified machining instructions different from the original machining instructions for machining the entire workpiece. For example, the machining of the workpiece with the machining instructions and the machining of the workpiece with a group of the modified machining instructions produce two different results, i.e., two different geometries.

Each group of the modified machining instructions is associated with a sub-workpiece. For example, one embodiment creates as many groups of the modified machining instructions as a number of remote hosts. This embodiment associates the remote hosts with different sub-workpieces, such that each remote host is associated with the corresponding sub-workpiece.

Each group of the modified machining instructions includes effective machining instructions and fake machining instructions. The effective machining instructions include a subset of the original machining instructions that move the machining tool through the sub-workpiece. The fake machining instruction moves the machining tool through the model of the workpiece outside of the sub-workpiece. For example, the fake machining instruction is indeed the fake one, i.e., different from all machining instructions received for the simulation. Such a fake instruction can be unique for each group of the modified machining instruction or can be shared by at least some groups. Additionally or alternatively, the fake machining instruction can include a subset of the machining instructions that move the machining tool through the model of the workpiece outside of the sub-workpiece. Different groups can include different subsets to hide the original machining instructions. For example, in one embodiment, each group includes different fake machining instructions tailored for the associated sub-workpiece. However, in various embodiments, the combination of the effective and fake instructions selected for each group of the modified machining instructions does not result in the original machining instructions.

The method causes 510 the remote hosts to simulate the machining of the workpiece using at least one group of the modified machining instructions to produce geometries of a machining simulation of the workpiece. Each geometry is associated with a corresponding sub-workpiece but represents the simulation of the machining of the entire workpiece according to effective and fake machining instructions.

For example, one embodiment transmits 503, to each remote host over a communication link, the group of modified machining instructions associated with the corresponding sub-workpiece. The remote hosts perform the simulation of the machining according to the transmitted machining instructions to produce the geometries of machining simulations of the workpiece. To that end, the embodiment receives 504 from each remote host, in response to the transmitting, the geometry associated with the corresponding sub-workpiece.

In one implementation, the embodiment also transmits the model of the workpiece to be machined. In alternative implementation, the model of the workpiece is predetermined and/or included in the simulation software deployed to the remote hosts.

Next, the embodiment reconstructs 505 a representation of the machined workpiece using a portion of each geometry within the volume of the corresponding sub-workpiece. For example, one embodiment produces the representation of the machined workpiece by extracting a portion of each geometry within the volume of the corresponding sub-workpiece to produce a set of clipped geometries and combines in a memory the set of clipped geometries. For example, the clipped geometries are combines according to locations of associated sub-workpieces within the model of the workpiece. Additionally or alternatively, one embodiment produces the representation of the machined workpiece by rendering images corresponding to a portion of each geometry within the volume of the corresponding sub-workpiece to form a composite image on a display device representing the machined workpiece.

Figure 6A:
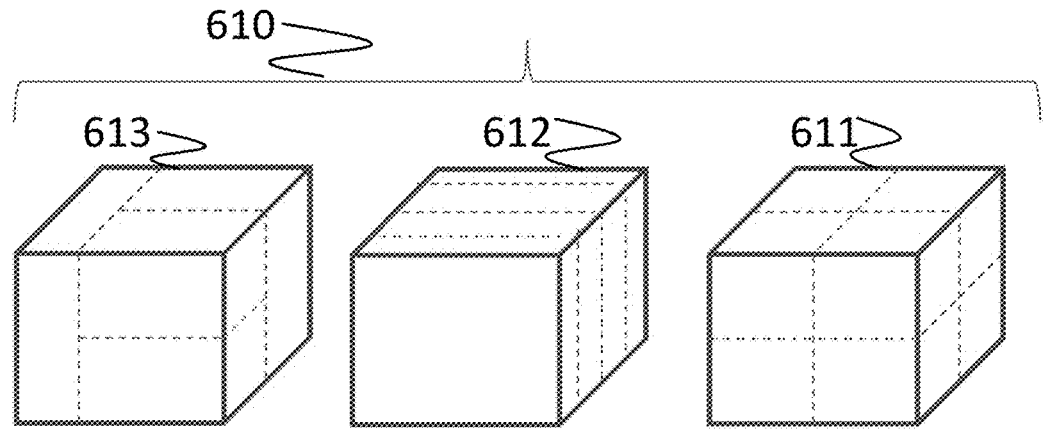
FIG. 6A shows examples of partitioning a workpiece according to different embodiments.

FIG. 6A shows examples 610 of partitioning a workpiece according to different embodiments. Given the bounding box of the input workpiece, the bounding box is partitioned into to non-overlapped volumes. The number of non-overlapped volumes can be the same as the number of remote hosts. Each partitioned volume is referred herein as a sub-workpiece. The partitioning needs to satisfy two constraints. First, the sub-workpieces are not overlapped. Second, their union can cover the entire bounding box of the input workpiece. Otherwise the partitioning can be arbitrary.

The sub-workpieces can have different volumes, the partitioning can occur along different dimensions. For example, some embodiments partition the model of the workpiece into the set of volumes having identical shapes and dimensions, as in an example 611. Alternative embodiments partition the model of the workpiece into the set of volumes having different shapes and/or dimensions. For example, the workpieces 612 is partitioned into lops having different widths. The workpiece 613 is partitioned into cuboids of different dimensions.

Various embodiments copy the original machining instruction and modify the copied machining instructions for this sub-workpiece. The instructions that lead to a swept volume to intersect this sub-workpiece are called effective for this sub-workpiece. The instruction modification preserves all effective instructions for this sub-workpiece and mixes the effective ones with extra instructions that will not impact simulation result within the sub-workpiece.

Figure 6B:
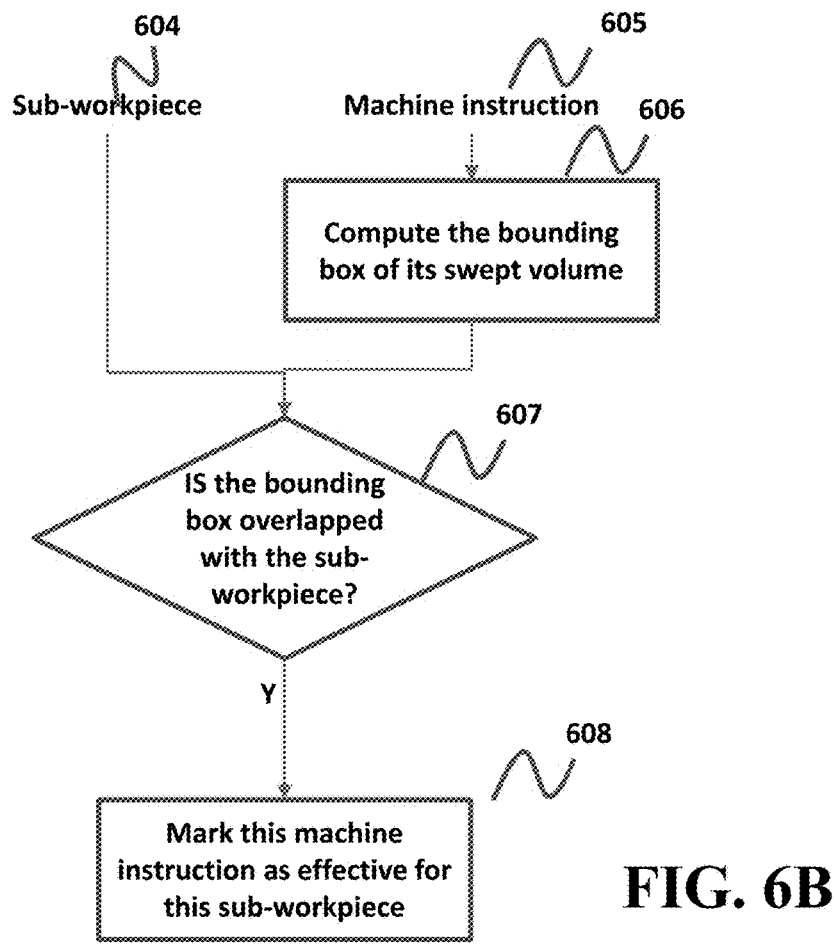
FIG. 6B shows a flow chart of steps to check whether an instruction is effective for a sub-workpiece according to some embodiments.

FIG. 6B shows a flow chart of steps to check whether an instruction (605) is effective for a sub-workpiece (604) according to some embodiments. These embodiments first compute (606) the bounding box of the corresponding swept volume and then check (607) whether bounding box is overlapped with the sub-workpiece. If yes, this machining instruction is effective.

Figure 7A:
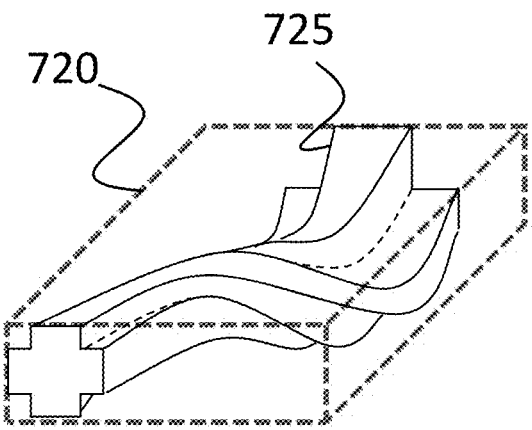
FIG. 7A shows an example of a bounding box that bounds a sept volume of a machining instruction.

FIG. 7A shows an example of a bounding box 720 that bounds a sept volume 725 of a machining instruction formed by an intersection of a volume of the model of the workpiece with a volume formed by a motion of a shape of the machining tool according to the machining instruction.

Figure 7B:
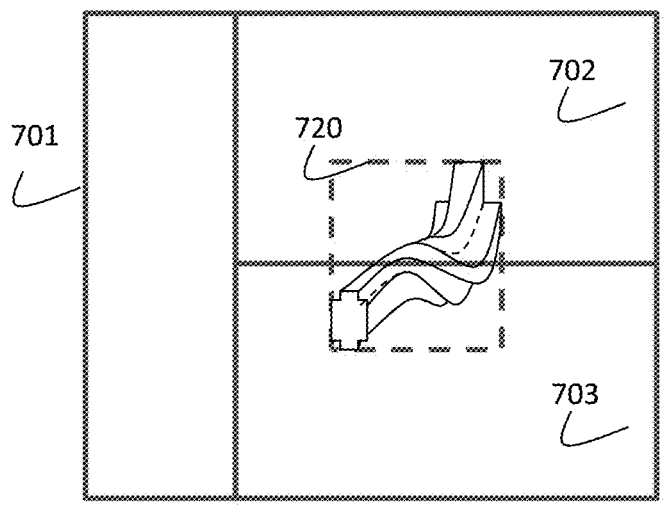
FIG. 7B shows an example of checking the overlapping of the bounding box of the swept volume with different sub-workpieces according to different embodiments.

FIG. 7B shows an example of checking the overlapping of the bounding box 720 of the swept volume 725 with three sub-workpieces 701, 702, and 703. In this example, the bounding box of the swept volume overlaps with sub-workpieces 702 and 703. Hence, the machining instruction that formed the swept volume 725 is effective for these sub-workpieces 702 and 703 and is selected into the group of modified machining instructions associated with the sub-workpieces 702 and/or 703.

However, the bounding box of the swept volume does not intersect the sub-workpiece 701, and thus, the machining instruction that formed the swept volume 725 is not effective for the sub-workpiece 701 and does not have to be selected for the group of modified machining instructions associated with the sub-workpiece 701.

After identifying the effective machine instructions for each sub-workpiece, some embodiments generate extra machining instructions whose swept volume overlaps with the input workpiece but not this sub-workpiece. These instructions are called fake instructions for this sub-workpiece.

When simulating the modified machine instruction program with the fake instructions, the effective instructions generate true compute geometry within the sub-workpiece, while the fake instructions generate fake compute geometry outside the sub-workpiece but still within the input workpiece. Consequently, the simulated computer geometry of the entire workpiece is incorrect. Because the knowledge of the location of the sub-workpiece within the workpiece and geometry of the workpiece is required to extract the true computer geometry, retaining sub-workpiece on local host less useful making the distributed simulation according to various embodiments secure.

After a simulation server on a remote host finishes the simulation of a modified instruction program, the server can sends the simulated computer geometry to the simulation client of the local host. If the computer geometry is represented as a grid volume, which subdivides the spatial domain into rectangular cells, and the boundaries of the sub workpieces align with the grid cell edges, the simulation client can extract the computer geometries within the sub-workpieces and composite as a single representation. If the computer geometry is represented as other format, such as irregular volumes or triangle meshes, the simulation client can defer the compositing step when rendering an image on a display device.

Figure 8A:
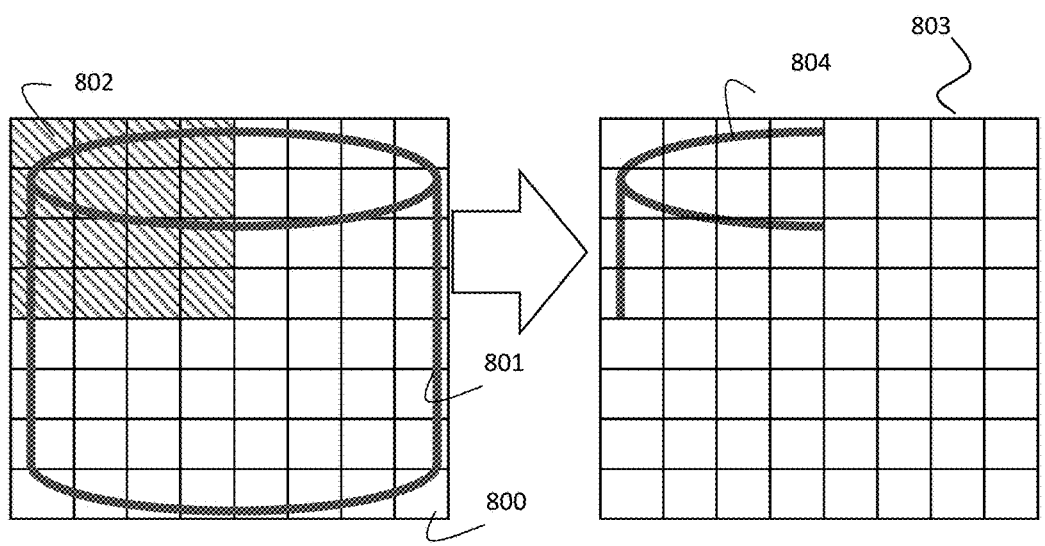
FIGS. 8A and 8B show examples of using a grid of cells to partition a workpiece according to some embodiments.
Figure 8B:
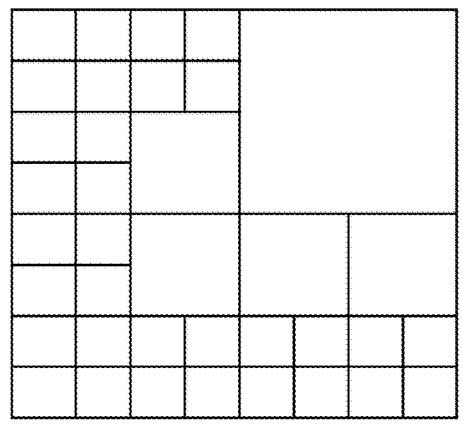

FIGS. 8A and 8B show examples of using a grid of cells to partition a workpiece according to some embodiment. The cells can be of the same size as in an example of FIG. 8A or can have different sizes as in example of FIG. 8B. In some embodiments, the boundaries of the sub-workpieces are aligned with the boundaries of the cell. Such an alignment facilitates subsequent extraction of a geometry received from a remote host.

For example, a workpiece 800 is represented by a grid 803 and borders of a sub-workpiece 802 are aligned with borders of some cells of the representation. To that end, when the geometry of the machining simulation 801 is received from the host associated with the sub-workpiece 802, a portion of the geometry within the cells of the corresponding sub-workpiece is extracted to produce a clipped geometry 804.

Figure 8C:
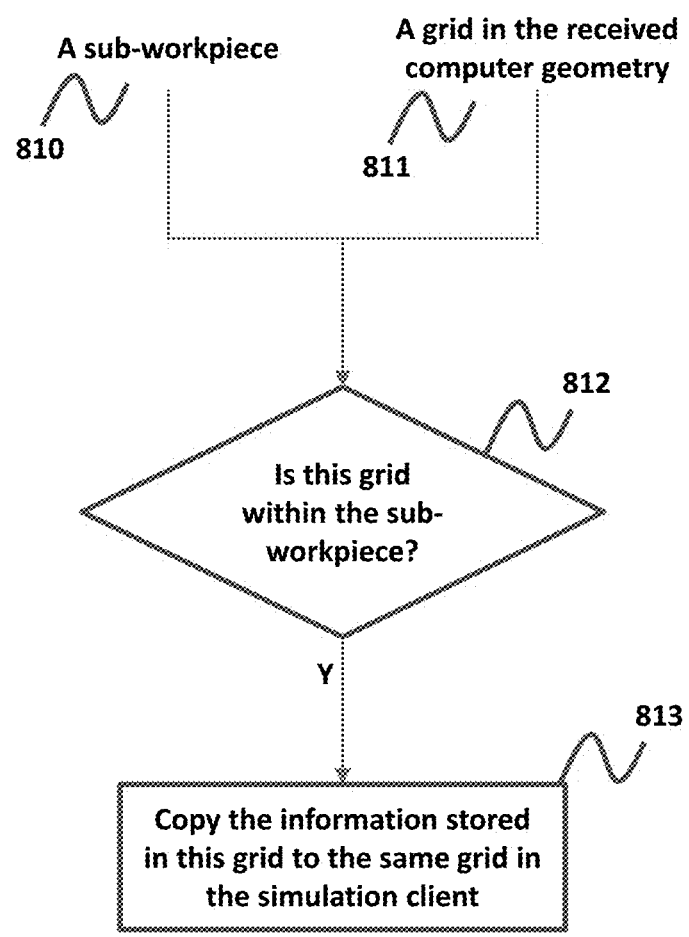
FIG. 8C shows a block diagram a method for extracting the geometry of the machining simulation according to one embodiment.

FIG. 8C shows a block diagram for extracting the geometry of the machining simulation according to one embodiment. In this example, the simulation client subdivides the input workpiece according to a grid 803. The received computer geometry 811 is also represented as grid and the simulation client compares the received grid and the simulation client checks 812 the location of the each grid cell 811 to see whether this cell is within the sub-workpiece 810. If the grid cell is within the sub-workpiece, the information stored in this grid cell is copied 813 to the same cell on the local simulation client. After copying the cells within the sub-workpiece, the computer geometry within the sub-workpiece 804 is extracted. Once the computer geometries from all remote hosts are received, the local host obtains the computer geometry of the entire input workpiece. The combined computer geometry can be rendered on the display device for users to visualize and analyze the simulation result.

Figure 9:
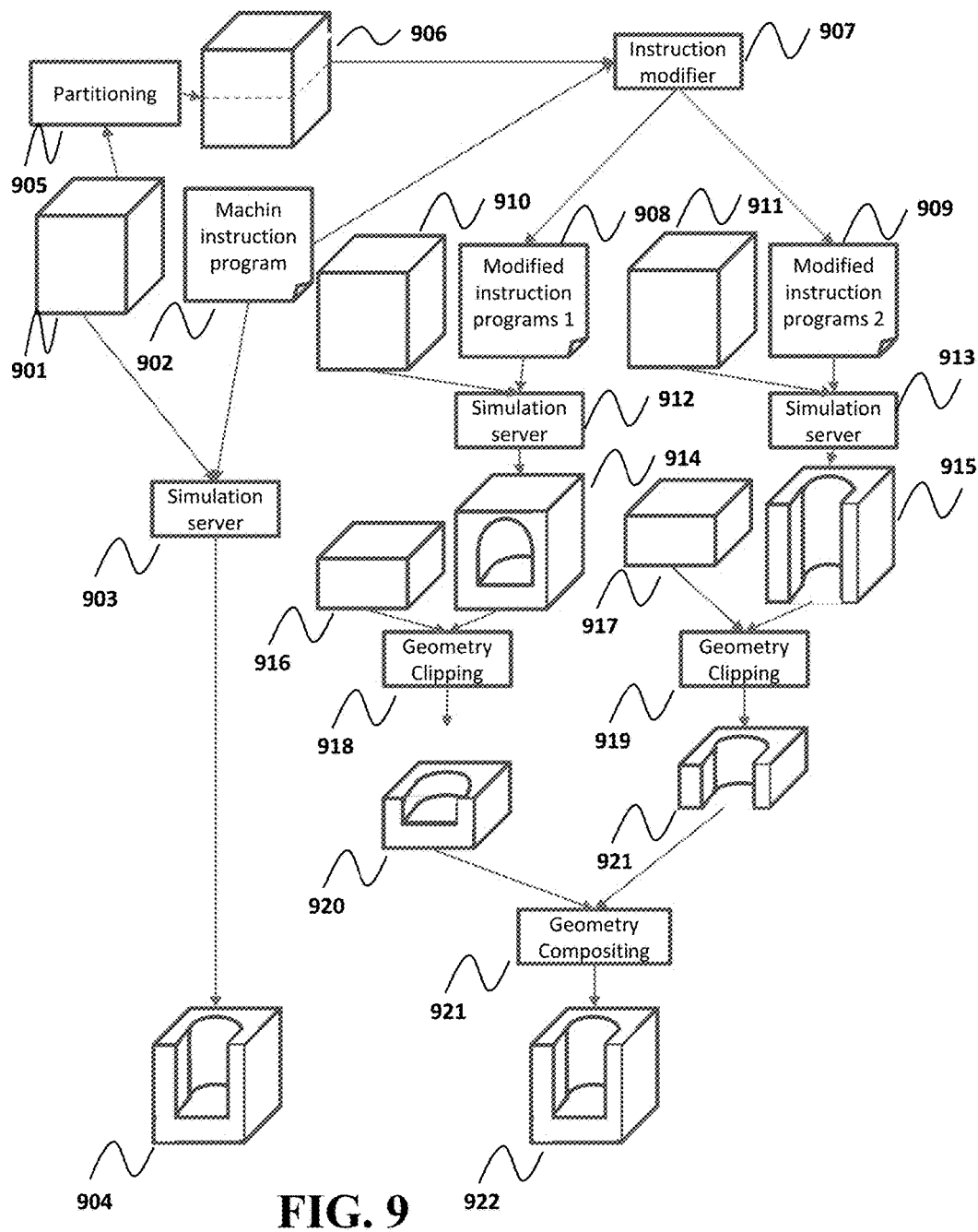
FIG. 9 shows a block diagram of a method for extracting and combining geometries of simulation results according to some embodiments.

FIG. 9 shows a block diagram of a method for extracting and combining geometries of simulation results according to some embodiments. Given the input workpiece 901 and machining instructions 902, which can be simulated 903 to generate the simulation result 904, the input workpiece is partitioned (905) into sub-workpieces 906. Based on the partitioning, the machining instructions are copied and modified 907. Each sub-workpiece is associated with the modified instructions 908 and 909. By simulating the modified instructions on copies 910 and 911 of the original input workpiece 901, the simulation servers, e.g., the remote hosts 912 and 913, generate simulation results 914 and 915 that are different from the expected simulation result 904.

However, the simulation client clips 918 and 919 the simulation result of modified machining instructions according to its corresponding sub-workpiece 916 and 917. The combination of the clipped computer geometries 920 and 921 can match the corresponding portion in the original simulation result 904. Thus, these clipped computer geometries can be combined 921 into a single representation 922, which is the same as the expected representation 904 that can be performed without partitioning. Notably, the combination is performed by a local simulation client. The remote hosts do not have information about location, shape and dimensions of the sub-workpiece and thus cannot extract the corresponding computer geometry.

Figure 10A:
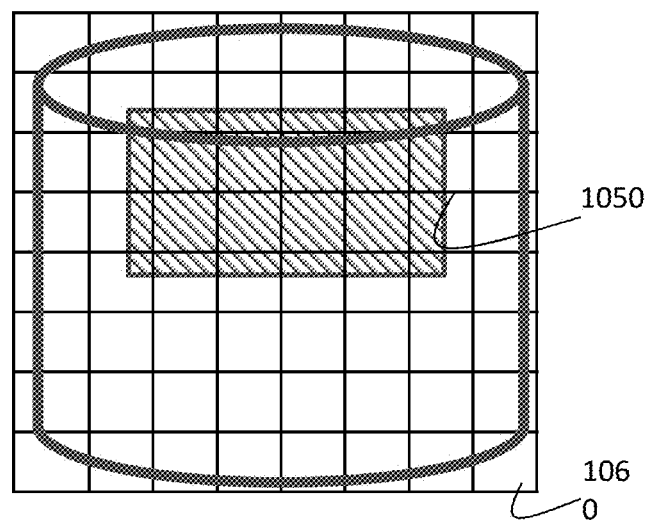
FIG. 10A shows an example when computer geometries are not represented by grids or the boundary of sub-workpiece is not aligned with the grid boundary according to some embodiments.

FIG. 10A shows an example when computer geometries are not represented by grids or the boundary of sub-workpiece is not aligned with the grid boundary according to some embodiments. For example, in FIG. 10A, boundaries 1050 of the sub-workpiece are not aligned with the edges of the grid 1060. In such a case, some embodiments the simulation client can choose not to combine the geometry, but to render images corresponding to a portion of each geometry within the volume of the corresponding sub-workpiece to form a composite image on a display device. For example, the simulation client can store computer geometries of all sub-workpieces, render each all on them into images, and composite the images into a single one, which is identical to rendering the simulation result without partitioning.

Figure 10B:
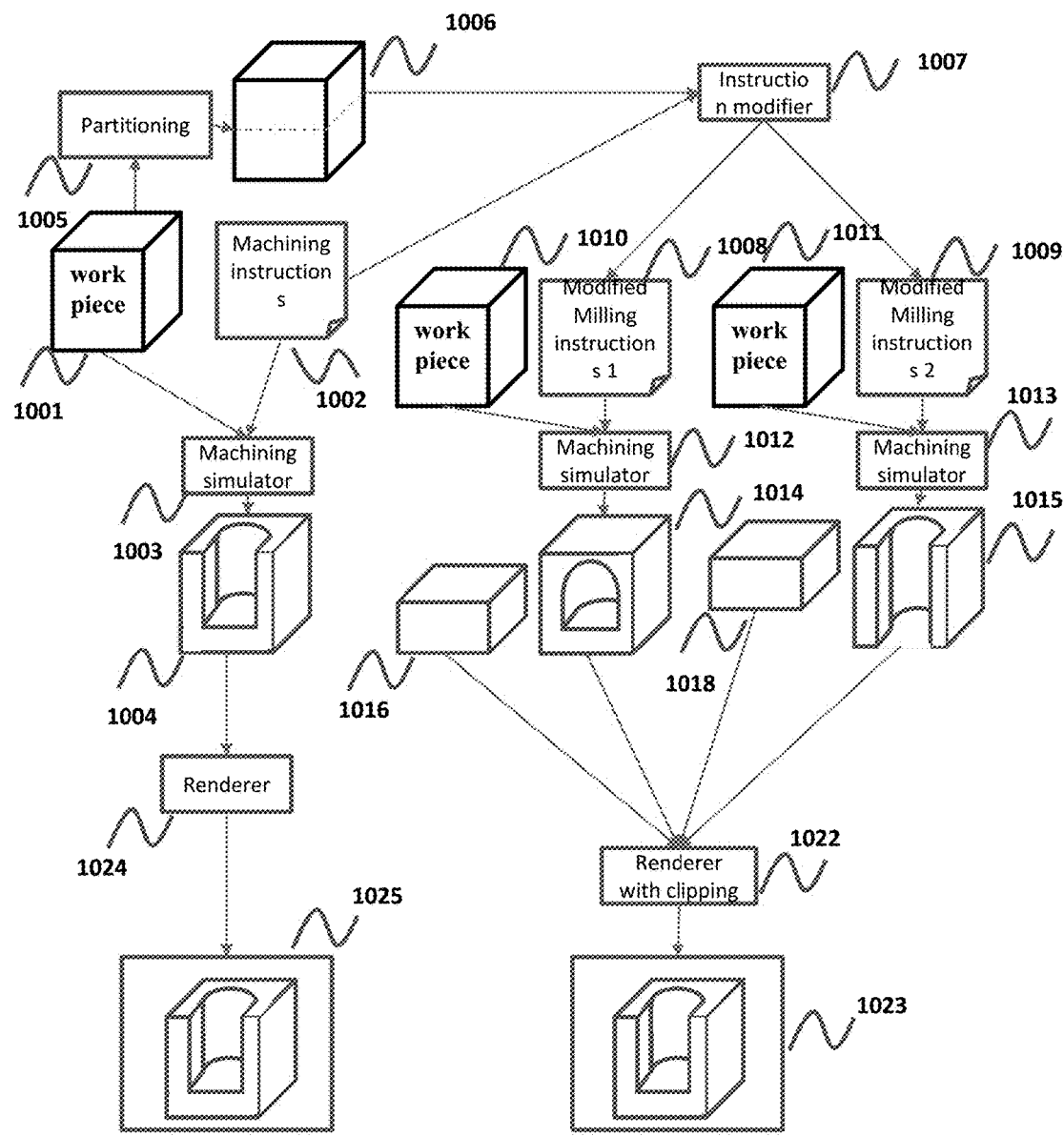
FIG. 10B shows a schematic of a method for rendering an image that combines clipped geometries from different simulations according to one embodiment.

FIG. 10B shows a schematic of a method for rendering an image that combines clipped geometries from different simulations according to one embodiment. Given the input workpiece 1001 and machining instructions 1002, which can be simulated 1003 to generate the simulation result 1004, the input workpiece can be partitioned 1005 into sub-workpieces 1006. Based on the sub-workpieces, the machining instructions are copied and modified 1007. Each sub-workpiece has its own modified group machining instructions 1008 and 1009. By simulating the modified instructions on copies 1010 and 1011 of the original input workpiece 1001, the simulation servers 1012 and 1013 generate simulation result 1014 and 1015 that are different from the expected simulation result 1004.

When rendering computer geometries 1014 and 1015, the renderer 1022 uses the corresponding sub-workpieces 1016 and 1018 to generate corresponding clipped image having portions outside the sub-workpiece hidden in the images. Each pixel in clipped images stores both color and depth of the computer geometry within the sub-workpieces. With the depth, the clipped images are rendered 1022 into a single image 1023 to produce an image similar the image 1025 received by rendering 1024 the computer geometry 1004 simulated without partitioning.

FIG. 11A shows a schematic of rendering the simulated computer geometry 1101 into an image 1102. FIG. 11B shows the top view of the computer geometry and the image plane 1103. FIG. 11C shows a schematic of the front most fragments that update the pixels of the image of FIG. 11A.

Each cell on the image plane 1103 is called a pixel of the image. A pixel records the color of the front most surface visible through this pixel. The location of the pixel is denoted as (x, y), and the color and distance are denoted as $C(x, y)$ and $D(x, y)$, respectively.

Before render the computer geometry, the pixel's color and depth are reset. To render the compute geometry, some embodiments rasterize the surface of the computer geometry into small elements called fragments 1104. Imagining that a ray is casted through a pixel, a fragment is the small surface patch around where the ray and the computer geometry intersects. Because a computer geometry has multiple layers of surface, the ray from a pixel can intersect multiple fragments.

Figure 11D:
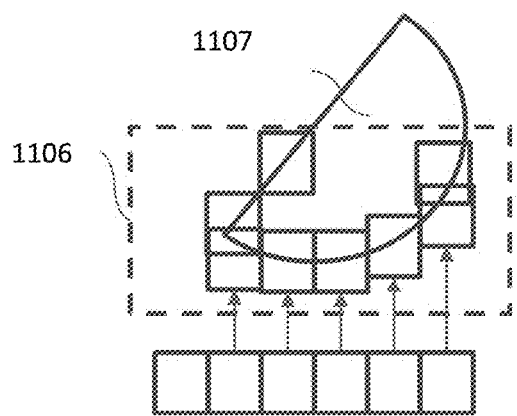
FIG. 11D shows a schematic of how the rasterized fragments are discarded according to some embodiments.
Figure 12A:
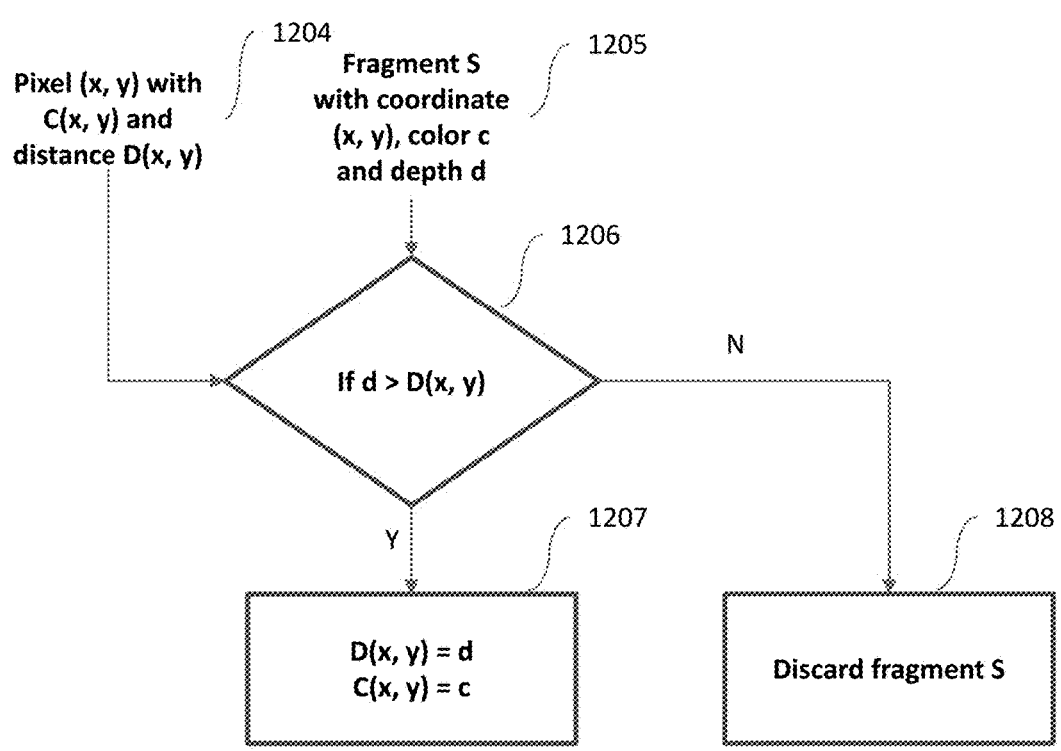
FIG. 12A shows a flow diagram to update the color and distance for a pixel of an image of FIG. 11A.

FIG. 12A shows a flow diagram to update the color and distance for a pixel 1204 at location (x, y) for an image 1102 of FIG. 11A. Given a new fragment 1205 at this pixel location (x, y) with color c and distance d, if its distance d is closer than the recorded distance $D(x, y)$ 1206, of the corresponding pixel, the color and distance of this pixel is updated 1207 by the color and distance of this new pixel.

Figure 11E:
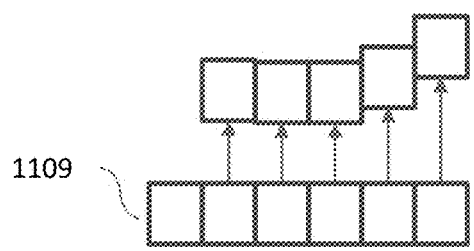
FIG. 11E shows a schematic of images with the front most fragments of FIG. 11D.
Figure 11F:
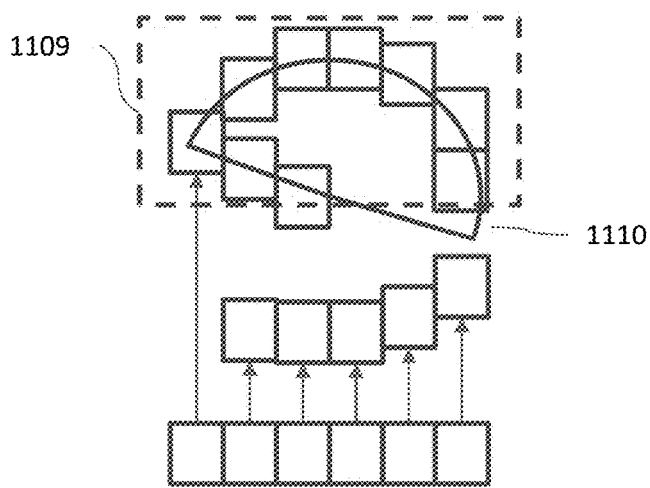
FIG. 11F shows how the rasterized fragments of computer geometry are clipped against its sub-workpieces according to some embodiments.
Figure 11G:
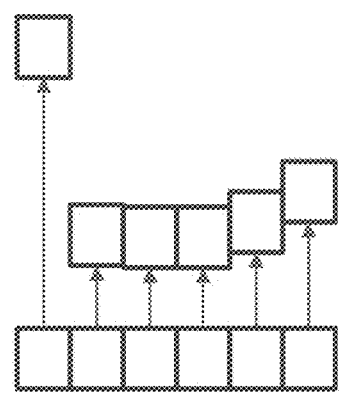
FIG. 11G shows a schematic of the image after updating the fragments in FIG. 11F.
Figure 12B:
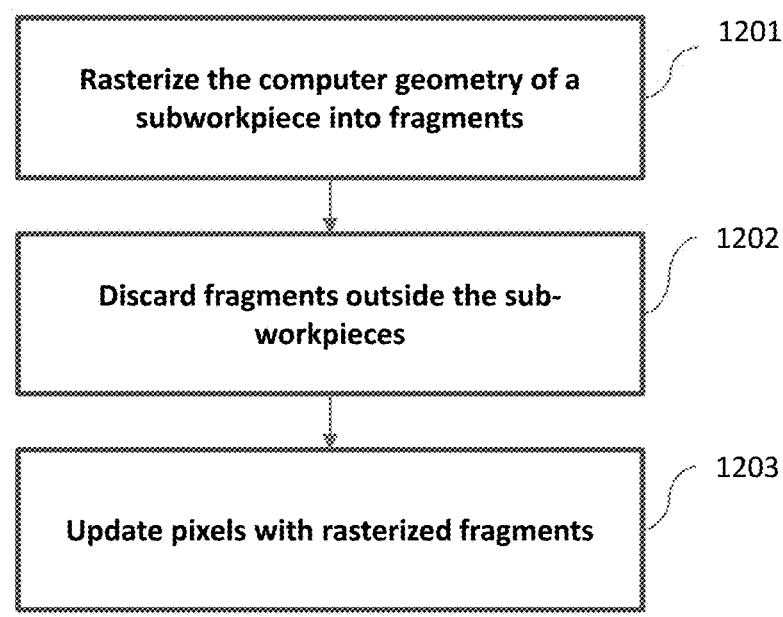
FIG. 12B shows a flowchart of a method that renders a computer geometry for a sub-workpiece according to some embodiments.

FIG. 12B shows a flowchart of a method that renders a computer geometry for a sub-workpiece according to some embodiments. FIGS. 11D-11G illustrate the steps of the method of FIG. 12B. Specifically, FIG. 11D shows how the rasterized fragments are discarded when outside of a sub-workpiece; FIG. 11E shows the images after keep the front most fragments of FIG. 11D; FIG. 11F shows how the rasterized fragments of computer geometry are clipped against its sub-workpieces; and FIG. 11G shows the images after updating the fragments in FIG. 11F.

Given the computer geometry 1107 for a sub-workpiece 1106, as shown in FIG. 11D, the method rasterizes 1201 the geometry into fragments and then discard 1202 the fragments outside of the corresponding sub-workpiece. The remained fragments are used to update 1203 the images. After examining all remained fragments, the image 1109 records the color and distance to the front most surface of the computer geometry within the sub-workpiece 1106.

This procedure is repeated for all sub-workpieces. As shown in FIG. 11F, given another computer geometry 1110, the method rasterizes the surface into fragments within its sub-workpiece 1109. The fragments are used to update the pixels, such that only the closer one to the images planes are retained. FIG. 11G shows the final image where each pixel records the distance and color of the same fragments as those of FIG. 11C.

Compared to geometry-based compositing, image-based compositing is more general, but the rendering is slower because the simulation client needs to render multiple computer geometries. Nevertheless, image-based compositing is equally secured as object-based compositing because remote hosts still do not have the information about their sub-workpieces.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A method for simulating machining of a workpiece according to machining instructions for moving a machining tool with respect to the workpiece, wherein the simulation is performed using a processor in communication with a set of remote hosts, wherein the processor is coupled with stored instructions implementing the method, wherein the stored instructions, when executed by the processor carry out at least some steps of the method, comprising:

partitioning a model of the workpiece into nonintersecting volumes to produce a set of sub-workpieces;

modifying, for each sub-workpiece, the machining instructions to produce a set of groups of modified machining instructions different from the machining instructions, each group of the modified machining instructions is associated with a sub-workpiece and includes effective machining instructions that move the machining tool through the sub-workpiece and at least one fake machining instruction that moves the machining tool through the model of the workpiece outside of the sub-workpiece;

causing the remote hosts to simulate the machining of the workpiece using at least one group of the modified machining instructions to produce geometries of a machining simulation of the workpiece, each geometry is associated with a corresponding sub-workpiece; and reconstructing a representation of the machined workpiece using a portion of each geometry within the volume of the corresponding sub-workpiece.

2. The method of claim 1, modifying the machining instructions for a sub-workpiece comprises:

determining, for each machining instruction, a swept volume associated with a machining instruction, the swept volume is formed by an intersection of a volume of the model of the workpiece with a volume formed by a motion of a shape of the machining tool according to the machining instruction;

determining a bounding box of the swept volume; and selecting the machining instruction as the effective machining instruction for the group of the modified machining instructions associated with the sub-workpiece if the bounding box of the swept volume overlaps with the sub-workpiece.

3. The method of claim 2, further comprising:

creating the fake machining instruction for the sub-workpiece that differs from all of the machining instructions; and adding the fake machining instruction into the group of the modified machining instructions associated with the sub-workpiece.

4. The method of claim 2, further comprising:

creating the fake machining instruction for the sub-workpiece as a subset of the machining instructions that move the machining tool through the model of the workpiece outside of the sub-workpiece; and adding the fake machining instruction into the group of the modified machining instructions associated with the sub-workpiece.

5. The method of claim 1, wherein the partitioning comprises:

partitioning the model of the workpiece into the sub-workpieces having identical shapes and dimensions.

6. The method of claim 1, wherein the partitioning comprises:

partitioning the model of the workpiece into the sub-workpieces having different shapes, dimensions, or combination of both.

7. The method of claim 1, wherein a number of sub-workpieces equals a number of remote hosts, further comprising:

associating the remote hosts with different sub-workpieces, such that each remote host is associated with the corresponding sub-workpiece;

transmitting to each remote host over a communication link the group of modified machining instructions associated with the corresponding sub-workpiece; and receiving from each remote host, in response to the transmitting, the geometry associated with the corresponding sub-workpiece.

8. The method of claim 7, further comprising:
transmitting to the remote host the model of the workpiece.

9. The method of claim 1, wherein the reconstructing comprises:
extracting a portion of each geometry within the volume of the corresponding sub-workpiece to produce a set of clipped geometries; and
combining in a memory the set of clipped geometries according to locations of associated sub-workpieces within the model of the workpiece to produce the representation of the machined workpiece.

10. The method of claim 1, wherein the reconstructing comprises:
rendering images corresponding to a portion of each geometry within the volume of the corresponding sub-workpiece to form a composite image on a display device representing the machined workpiece.

11. The method of claim 10, wherein the rendering comprises:
rasterizing the geometry associated with the sub-workpiece into fragments;
discarding fragments outside the sub-workpiece; and
updating pixels of the image according to the rasterized fragments.

12. A system in a communication with a set of remote hosts for simulating machining of a workpiece according to machining instructions for moving a machining tool with respect to the workpiece, the system comprising:
a memory to store the machining instructions and a model of the workpiece;
a processor to
partition a model of the workpiece into nonintersecting volumes to produce a set of sub-workpieces; and
modify the machining instructions for each sub-workpiece to produce a set of groups of modified machining instructions different from the machining instructions, each group of the modified machining instructions is associated with a sub-workpiece and includes effective machining instructions that move the machining tool through the sub-workpiece and at least one fake machining instruction that moves the machining tool through the model of the workpiece outside of the sub-workpiece; and
a transceiver to
transmit to each remote host over a communication link the group of modified machining instructions associated with the corresponding sub-workpiece and
receive from each remote host, in response to the transmitting, the geometry associated with the corresponding sub-workpiece,
wherein the processor reconstructs a representation of the machined workpiece using a portion of each geometry within the volume of the corresponding sub-workpiece.

13. The system of claim 12, further comprising:
a display device for rendering the representation of the machined workpiece.

14. The system of claim 12, wherein the processor modifies the machining instructions for the sub-workpiece by
determining, for each machining instruction, a swept volume associated with a machining instruction, the swept volume is formed by an intersection of a volume of the model of the workpiece with a volume formed by a motion of a shape of the machining tool according to the machining instruction;
determining a bounding box of the swept volume;
selecting the machining instruction as the effective machining instruction for the group of the modified machining instructions associated with the sub-workpiece if the bounding box of the swept volume overlaps with the sub-workpiece.

15. The system of claim 12, wherein the processor further modifies the machining instructions for the sub-workpiece by
creating the fake machining instruction for the sub-workpiece that differs from all of the machining instructions; and
adding the fake machining instruction into the group of the modified machining instructions associated with the sub-workpiece.

16. The system of claim 12, wherein the processor further modifies the machining instructions for the sub-workpiece by
creating the fake machining instruction for the sub-workpiece as a subset of the machining instructions that move the machining tool through the model of the workpiece outside of the sub-workpiece; and
adding the fake machining instruction into the group of the modified machining instructions associated with the sub-workpiece.

17. The system of claim 12, wherein the processor determines the representation of the machined workpiece by
extracting a portion of each geometry within the volume of the corresponding sub-workpiece to produce a set of clipped geometries; and
combining in a memory the set of clipped geometries according to locations of associated sub-workpieces within the model of the workpiece to produce the representation of the machined workpiece.

18. The system of claim 12, wherein the processor determines the representation of the machined workpiece by
rendering images corresponding to a portion of each geometry within the volume of the corresponding sub-workpiece to form a composite image on a display device representing the machined workpiece.

19. The system of claim 18, wherein the processor determines the representation of the machined workpiece by
rasterizing the geometry associated with the sub-workpiece into fragments;
discarding fragments outside the sub-workpiece; and
updating pixels of the image according to the rasterized fragments.

20. A non-transitory computer readable storage medium embodied thereon a program executable by a processor for performing a method, the method comprising:
partitioning a model of the workpiece into nonintersecting volumes to produce a set of sub-workpieces;
modifying the machining instructions for each sub-workpiece to produce a set of groups of modified machining instructions different from the machining instructions, each group of the modified machining instructions is associated with a sub-workpiece and includes effective machining instructions that move the machining tool through the sub-workpiece and at least one fake machining instruction that moves the machining tool through the model of the workpiece outside of the sub-workpiece;
causing the remote hosts to simulate the machining of the workpiece using at least one group of the modified machining instructions to produce geometries of a machining simulation of the workpiece, each geometry is associated with a corresponding sub-workpiece; and
determining a representation of the machined workpiece using a portion of each geometry within the volume of the corresponding sub-workpiece.

\* \* \* \* \*